April 2, 1963

B. E. BALTHAZOR 3,083,500

TOY VEHICLE WITH SPRING-MOUNTED AXLE

Filed May 22, 1961

INVENTOR.
B. E. BALTHAZOR

BY

ATTORNEY

April 2, 1963   B. E. BALTHAZOR   3,083,500
TOY VEHICLE WITH SPRING-MOUNTED AXLE
Filed May 22, 1961   2 Sheets-Sheet 2
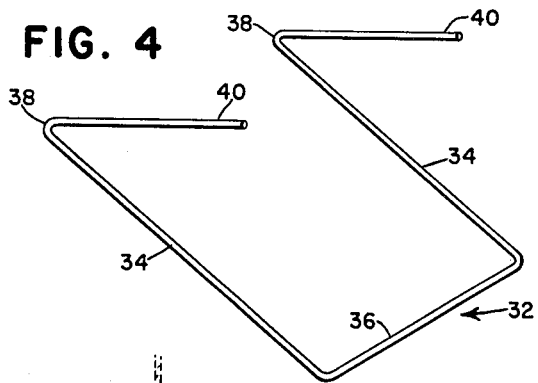
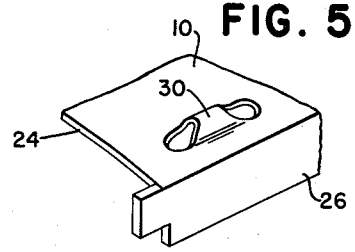
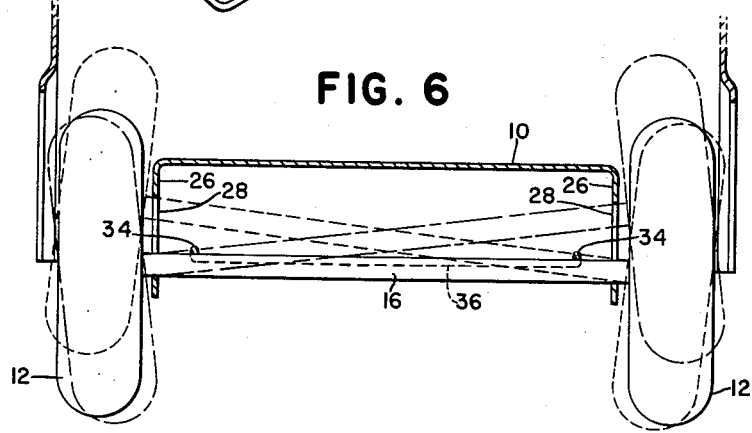
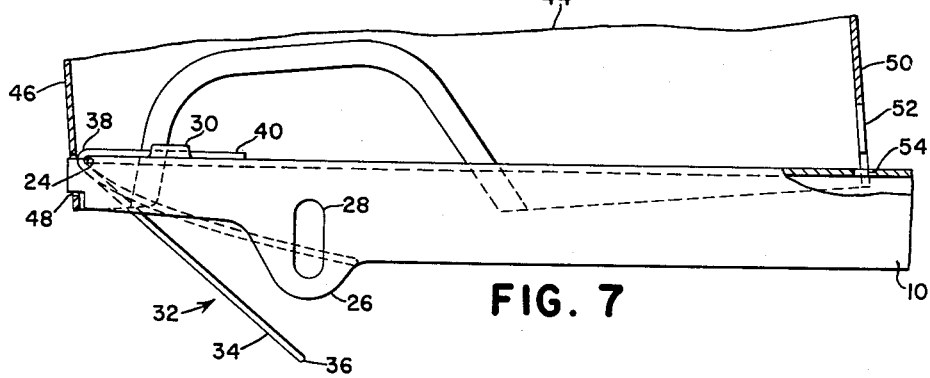
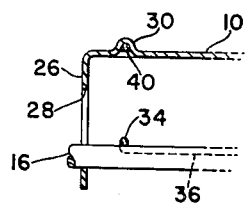
INVENTOR.
B. E. BALTHAZOR
BY
ATTORNEY

United States Patent Office 3,083,500
Patented Apr. 2, 1963

3,083,500
TOY VEHICLE WITH SPRING-MOUNTED AXLE
Bernard E. Balthazor, Moline, Ill., assignor to Buddy L Corporation, East Moline, Ill., a corporation of Delaware
Filed May 22, 1961, Ser. No. 111,722
8 Claims. (Cl. 46—221)

This invention relates to a toy vehicle and more particularly to an improved spring suspension for at least one of the vehicle axles.

The invention finds particular utility in that class of toy vehicles in which the toy simulates an actual vehicle, both functionally and in appearance. It is recognized, however, that many of the functional aspects cannot be achieved in manners identical to those in full-size vehicles, because of factors of cost, assembly, production etc. Therefore, many of the functional characteristics are of a simulated nature; although, in overall aspects, relatively faithful duplication is possible.

In copending application Serial No. 87,376, filed February 6, 1961, there is disclosed the basic idea of a spring suspension for the front axle of a vehicle which simulates individual wheel suspension in a relatively simple manner. The present invention provides an improvement over the prior invention in that the resilient means for biasing the axle downwardly away from the body is simplified as to design, construction and ease of assembly. It is a feature of the present invention to construct the spring means as a single piece of spring wire bent to U-shape and having means attachable to the vehicle body, with the legs of the U-shaped member engaging the axle from above to resiliently support the body on the axle, the axle being guided for generally vertical movement by guide means in the form of transversely alined upright slots respectively at opposite sides of the vehicle. It is a further object of the invention to provide improved attaching means for the spring, particularly in the form of mounting pintles which are respectively received in cooperative socket means on the vehicle. A further object is to associate the mounting means with the general assembly of the vehicles so that body portions are manipulatable to retain the attached spring in place.

The foregoing and other important objects and desirable features inherent in and encompassed by the invention will become apparent as a preferred embodiment thereof is disclosed in detail in the ensuing description and accompanying sheet of drawings, the figures of which are described below.

FIGURE 4 is a perspective, on a somewhat reduced scale, of the spring.

FIGURE 5 is a fragmentary perspective showing one of the socket means on the vehicle.

FIGURE 6 is a section on the line 6—6 of FIGURE 2, showing in broken lines two positions that the axle may assume.

FIGURE 7 is a view similar to FIGURE 3 but shows a prior stage in the assembly of the vehicle.

FIGURE 8 is a section on the line 8—8 of FIGURE 3.

Figure 1:
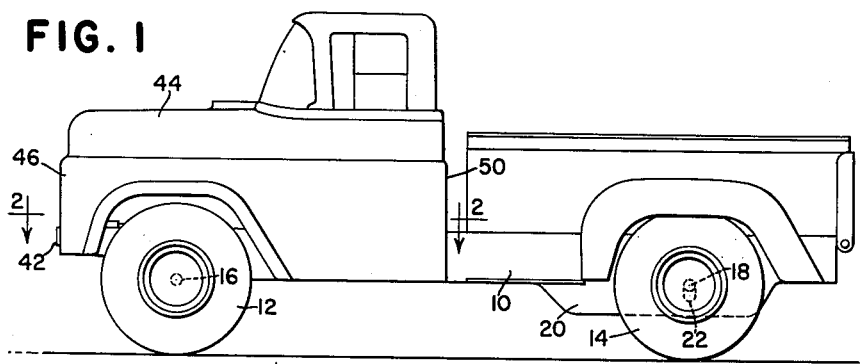
FIGURE 1 is an elevational view of a representative vehicle in which the invention is embodied.

The vehicle chosen for purposes of illustration has a longitudinal or fore-and-aft body 10 carried on front and rear wheels 12 and 14 by front and rear axles 16 and 18 respectively. The rear portion of the body has at opposite sides thereof depending supports 20 which are provided in transverse alinement with generally upright slots 22 which in this case loosely receive the rear axle 18 so that the axle may turn in the slots and also may move vertically relative to the body, the purpose of which will appear subsequently.

Figure 2:
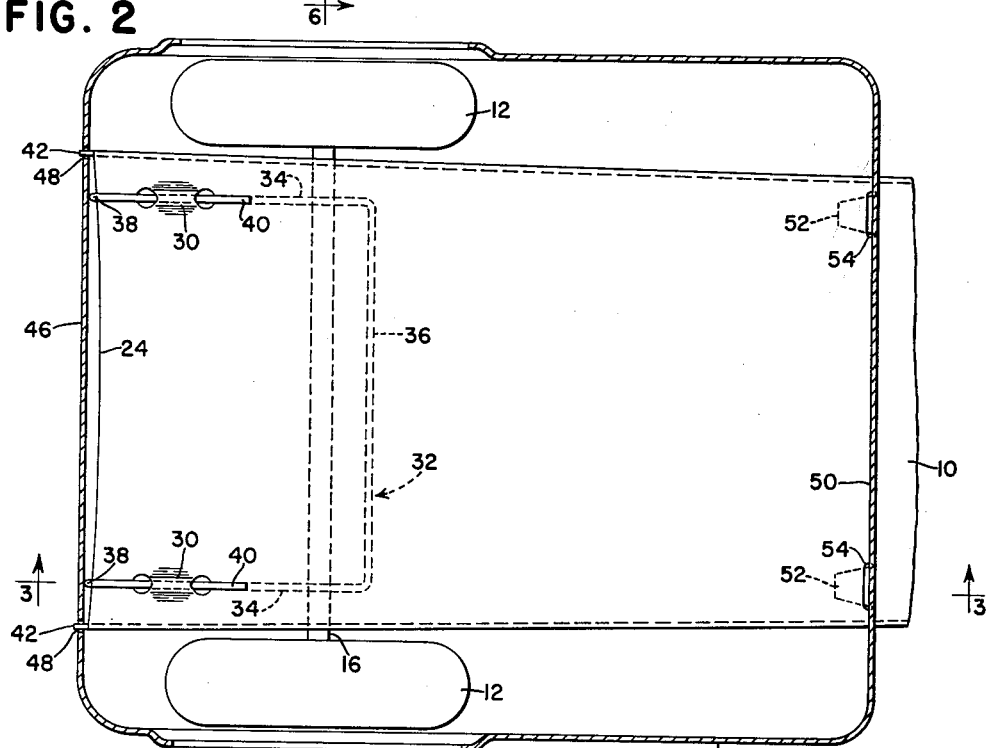
FIGURE 2 is an enlarged fragmentary section as seen generally along the line 2—2 of FIGURE 1.

The forward portion of the body terminates in a transverse front portion or edge 24, which is slightly arcuate as best shown in FIGURE 2. The forward portion of the body is further flanked at opposite sides by depending supports 26, each of which is provided with generally upright guide means, here in the form of slots 28. These slots loosely receive the axle 16 so that the axle is rotatable therein as well as being capable of vertical movement relative to the body 10.

A part of the body just rearwardly of the front transverse edge 24 is provided with a pair of transversely spaced longitudinally extending socket means 30, each of which is achieved as shown by perforating a proximate area of the sheet metal floor of the vehicle and deforming the intervening portion to form the longitudinal tunnel, the fore-and-aft dimension of which is determined by the fore-and-aft distance between the perforations which are preliminary to formation of the respective tunnel. These socket means serve to carry a U-shaped member of spring wire, designated in its entirety by the numeral 32. This member has transversely spaced apart fore-and-aft or longitudinally extending legs 34 and a transverse bight 36 which joins the legs 32 rearwardly of the axle 16. Each leg 34 has a terminal front end portion which is shaped as a hook, being bent upwardly at 38 and then rearwardly at 40 to provide an extension or mounting pintle. In installation, the bent-up portions 38 are hooked over the transverse front edge 24 in transversely spaced relation so that the pintles 40 project rearwardly and are received respectively in the socket means or tunnels 30. The links of the resilient arms afforded by the legs 34 are such that the bight 36 is normally disposed rearwardly of the axle 16, the legs at their rear portions riding on top of the axle and acting between the axle 24 and axle 16 to normally urge the axle 24 downwardly. The wire is of course cylindrical in cross section, as is the axle 16, and there is in effect a point contact at each of axially spaced apart portions in the axle and the friction is substantially negligible, which therefore does not interfere with the rotatable mounting of the axle. The wire is sufficiently resilient to normally carry the weight of the vehicle but will yield at either side (FIGURE 6) or uniformly so that the spring action of the front axle very closely duplicates that of a conventional full-sized vehicle. This of course adds materially to the realism of the toy and the enjoyment thereof by the young user.

Figure 3:
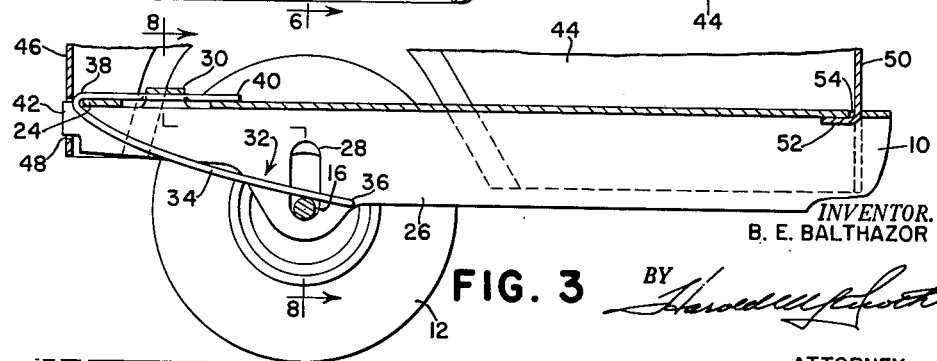
FIGURE 3 is a section on the line 3—3 of FIGURE 2.

In the installation of the spring member 32, it is attached to the vehicle in the manner aforesaid, in the absence of the axle 16, which gives the spring 32 the position as shown in full lines in FIGURE 7. The spring may be easily depressed or flexed to the dotted-line position and the axle inserted and the wheels mounted on the opposite ends thereof. The wire is smooth and has rounded corners, particularly at its junction with the transverse connecting means or bight 36 and therefore will not present any sharp edges to injure the user or other objects with which the vehicle is apt to come into contact. It is a further feature of the invention that the body has a manipulatable portion capable of retaining the spring 32 when its mounting pintles or extensions 40 are received in the socket means 30. This feature flows from the hooking over of the front ends of the spring at the transverse edge 24 of the body. At opposite sides of this transverse edge, the body 10 carries forwardly projecting tabs 42, one laterally outwardly of each spring portion 38. The body carries at its front end a combination hood-cab-fender-unit 44 which has a transverse wall 46 provided with apertures at 48 to respectively receive the forwardly projecting tabs or lugs 42. After the spring 32 is installed by receipt of its pintles 40 in the socket means 30, the cab is hooked over the forward portion of the body so that its apertures 48 are received respectively by the lugs or tabs 42. The cab is then rocked downwardly and its final installation completed by the provision on a transverse rear wall 50 thereof of a pair of depending tabs 52 which are received respectively in apertures 54 in the body. These tabs are then bent forwardly (FIGURES 2 and 3) to secure the unit 44 in place. Therefore, the forward wall 46 of the unit 44 constitutes a manipulatable portion of the body capable of functioning to retain the spring 32 in place. Rearward displacement of the spring is of course prevented by hooking the forward portions 38 thereof over the transverse body portion 24. The forward wall 46, when finally installed, overlies the portions 38 of the spring in front and therefore prevents forward displacement thereof. The spring thus not only accomplishes the proper function for the axle 32 but is capable of simple and easy installation and therefore lends itself readily to mass-production methods, thus materially reducing the cost over more expensive types of spring suspensions.

In view of the fact that the body as a whole is capable of rocking from side to side as well as straight up and down because of the spring 32, the slots 22 in the rear supports 20 for the rear axle 18 permit this movement without causing the rear wheels 14 to be lifted from the ground. Here again is an attribute that simulates the independent wheel suspension of full-sized vehicles.

Features and advantages other than those categorically listed here will readily occur to those versed in the art, as will many modifications and alterations in the preferred embodiment disclosed, all of which may be achieved without departure from the spirit and scope of the invention.

What is claimed is:

1. A toy vehicle having a longitudinal body including transversely spaced and alined depending supports provided respectively with upright guide means; a transverse axle received in the guide means for limited up and down movement relative to the body; a U-shaped member of spring material of relatively small cross-section having a generally transverse bight offset longitudinally in one direction from the axle and a pair of transversely spaced legs extending longitudinally in the opposite direction over and engaging the axle and respectively having free ends adjacent to the body; and means attaching said free ends to the body to anchor the member so that its legs act to resiliently support the body on the axle.

2. The invention defined in claim 1, in which: the attaching means includes a pair of socket means on the body and respectively receiving the free ends of the legs.

3. The invention defined in claim 2, in which: each socket means is longitudinally directed and the associated free end is insertable therein in one direction and withdrawable therefrom in the opposite direction.

4. The invention defined in claim 3, including: manipulatable means on the body operative to prevent withdrawal of said ends from the socket means.

5. A toy vehicle having a longitudinal body including a transverse front portion and transversely spaced depending supports rearwardly of said front portion and provided respectively with upright axle guide means in transverse alinement; a transverse axle carried by said guide means for limited up and down movement relative to the body; wheels coaxially on opposite end portions of the axle; a U-shaped member of spring material of relatively small cross-section disposed between the body and axle and having a transverse bight behind the axle and a pair of transversely spaced legs extending forwardly over and engaging the axle, said legs respectively having free end portions adjacent to said front portion of the body; and means attaching said free ends to the body adjacent said front portion to anchor the member so that its legs act to resiliently support the body on the axle.

6. A toy vehicle having a longitudinal body including a transverse front portion and transversely spaced depending supports rearwardly of said front portion and provided respectively with upright axle guide means in transverse alinement; a transverse axle carried by said guide means for limited up and down movement relative to the body; wheels coaxially on opposite end portions of the axle; a U-shaped member of spring material of relatively small cross-section disposed between the body and axle and having a transverse bight behind the axle and a pair of transversely spaced legs extending forwardly over and engaging the axle, said legs respectively having free end portions adjacent to said front portion of the body, each free end portion having an upwardly and rearwardly directed extension in the form of a hook hooking over the front portion of the body and extending rearwardly as a mounting pintle; and a pair of forwardly opening socket means on the body respectively receiving said pintles to anchor the member so that its legs act to resiliently support the body on the axle.

7. The invention defined in claim 6, including: manipulatable means on the body positionable ahead of said free end portions to prevent forward displacement of said extensions from said socket means.

8. A toy vehicle having a longitudinal body including transversely spaced and alined depending supports provided respectively with upright guide means; a transverse axle received in the guide means for limited up and down movement relative to the body; and means carried by the body for resiliently supporting the body on the axle, including a one-piece structure having a pair of transversely spaced longitudinally running arms of spring material of relatively small cross-section attached to the body in longitudinally spaced relation to the axle and extending longitudinally past the axle to end parts beyond said axle and engaging the axle respectively at transversely spaced portions thereof and biased to exert downward forces on said axle portions, and said structure having a transverse resilient element integral with and joining said end parts to space said end parts apart, said element being flexibly related to said arms to enable said arms to yield independently of each other.

References Cited in the file of this patent

UNITED STATES PATENTS 2,749,662     Bottleman _____ June 12, 1956